(12) United States Patent
Perrier et al.

(10) Patent No.: US 7,788,971 B2
(45) Date of Patent: Sep. 7, 2010

(54) SUPPORT FOR A TIRE MONITORING COMPONENT, SUPPORT AND MONITORING COMPONENT SYSTEM, TIRE AND WHEEL

(75) Inventors: Bernard Perrier, Clermont-Ferrand (FR); Thierry Penot, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 589 days.

(21) Appl. No.: 11/739,782

(22) Filed: Apr. 25, 2007

(65) Prior Publication Data
US 2007/0251620 A1   Nov. 1, 2007

(30) Foreign Application Priority Data
Apr. 25, 2006   (FR)   ................... 06 03673

(51) Int. Cl.
*G01M 17/02*   (2006.01)
(52) U.S. Cl. .............................................. 73/146
(58) Field of Classification Search ............... None
See application file for complete search history.

(56) References Cited

U.S. PATENT DOCUMENTS

| 6,581,657 | B1 | 6/2003 | Brown |
| 2005/0244605 | A1 | 11/2005 | Fahas et al. |
| 2006/0028331 | A1* | 2/2006 | Ito et al. .................... 340/445 |
| 2006/0220816 | A1 | 10/2006 | Scheungraber et al. |

FOREIGN PATENT DOCUMENTS

| DE | 202005005144 |    | 6/2005 |
| DE | 202005005144 | U1 | 6/2005 |
| FR | 2866895 |    | 9/2005 |
| WO | 9929524 |    | 6/1999 |
| WO | 9929524 | A  | 6/1999 |

* cited by examiner

*Primary Examiner*—Andre J Allen
(74) *Attorney, Agent, or Firm*—Jacox, Meckstroth & Jenkins

(57) ABSTRACT

The invention relates to a support for a component for monitoring a tire, of the type intended to be secured to a wheel and tire system and comprising a support for securing the component in which the support has a component retaining force which is an increasing function of the pressure of the medium surrounding the support.

21 Claims, 3 Drawing Sheets

SUPPORT FOR A TIRE MONITORING COMPONENT, SUPPORT AND MONITORING COMPONENT SYSTEM, TIRE AND WHEEL

BACKGROUND OF THE INVENTION

Field of the Invention

The present invention relates to a support for a tire monitoring component, to a support and tire monitoring component system, to a tire and to a wheel.

The prior art, particularly document FR 2 866 895, already discloses a support for a tire monitoring component, of the type intended to be secured to a wheel and tire system and comprising means for securing the component.

The tire monitoring component, which for example is a pressure sensor, a temperature sensor or a tire identifying device, is used to supply information about the tire to a computer of a motor vehicle fitted with the tire.

In this prior art, the support is secured to the wheel by bonding and the means for securing the component to the support comprise clips or a housing formed in the support.

There is, therefore, a need to provide a support that overcomes one or more problems of the prior art.

SUMMARY OF THE INVENTION

It is important for the retaining force of the component securing means to be altered easily so that a defective component can be replaced or a new type of component can be secured to the tire quickly and easily.

The invention seeks to propose an improved support of the aforementioned type in which the component securing means are simple and quick to use.

To this end, one object of the invention is to provide a support for a tire monitoring component of the aforementioned type, characterized in that the securing means has a component retaining force which is an increasing function of the pressure of the medium surrounding the support.

The retaining force with which the component is retained means the force needed to detach the component from the support. When fitting and positioning the component on the support, it is preferable for the retaining force to be low, if not zero. By contrast, when the tire is turning, it is necessary for the retaining force to be high in order to hold the component firmly in position on the support.

The support according to one aspect of the invention and the tire monitoring component are intended to be incorporated inside the tire. Thus, the medium surrounding the support is air, possibly pressurized.

The monitoring component is secured to the support when the tire is off the wheel, that is to say when the tire is deflated and at atmospheric pressure.

Once the monitoring component has been correctly positioned on the support, the tire is fitted to the wheel then inflated to its nominal service pressure.

Inflating the tire has the effect of increasing the pressure obtaining inside the tire. Thus, by virtue of the invention, the retaining force with which the securing means hold the component on the support increases and the component is firmly secured to the support.

Securing the component to the support is then particularly simple and quick because it merely entails a simple step of positioning the monitoring component on the support before carrying out the conventional steps of fitting and inflating the tire.

A support according to the invention may further comprise one or more of the following features:

the securing means are arranged in such a way that, when the support is secured to the wheel and tire system, and when the pressure of the medium surrounding the support is the atmospheric pressure, the component can be introduced in or extracted from the support.

The securing means comprise a housing for the monitoring component, formed in the support, the support being designed so that the higher the pressure of the medium surrounding the support, the smaller the volume of the housing.

Preferably, at atmospheric pressure, the dimensions of the housing exceed the dimensions of the component. Thus, during fitting at atmospheric pressure, it is possible to insert the component into the housing because their respective dimensions permit this. When the tire is inflated, the volume of the housing decreases and the walls of the support come into contact with the monitoring component so as to grip it and hold it firmly.

The support is made of a material the volume of which is a decreasing function of pressure, the housing being formed in the mass of the material.

The support is made of cellular foam comprising closed cells. Closed cells are cells which are sealed and separate from one another. The term "cellular foam" is also sometimes used.

The pressure obtaining inside each closed cell exceeds atmospheric pressure. Thus, at atmospheric pressure, the cells of this foam are deployed and the foam occupies its maximum volume.

The pressure obtaining inside each closed cell is below a nominal tire inflation pressure, for example equal to 2.2 bar. This allows the tire pressure to exceed the pressure within the cells of the foam as the tire is being inflated, causing the cells to be compressed. A material such as this is therefore one example of a material the volume of which varies as a function of pressure.

The cellular foam is made of any one of the materials from the set consisting of polyethylene, polyurethane, 1,2-polybutadiene, polyisobutylene, butyl rubber, polyisoprene, thermoplastic elastomer and a blend of nitrile rubber and polyvinyl chloride.

The support comprises a flexible envelope enclosing a gas, the flexible envelope being shaped such that its exterior surface defines the housing for the monitoring component, the gas pressure preferably exceeding atmospheric pressure and being below a nominal tire inflation pressure, for example equal to 2.2 bar.

The securing means comprise:
  component retaining means able to adopt a first position in which they release the component and a second position in which they retain the component, and
  means for actuating the retaining means, which are able to cause the retaining means to switch from one position to the other, the actuating means being operated by the pressure of the medium surrounding the support.

The actuating means comprise a mass of a material the volume of which is a decreasing function of pressure, the material for example being cellular foam comprising closed cells.

Another object of the invention is to provide a support and tire monitoring component system, characterized in that the support is according to the invention defined hereinabove.

Optionally, the monitoring component is chosen from any one of the elements of the set consisting of a temperature sensor, a pressure sensor, a strain gauge, an accelerometer, a relative humidity sensor, an emitter, a receiver, an electronic circuit, an identification device.

Another object of the invention is to provide a tire characterized in that it comprises a support according to the invention defined hereinabove.

The support is secured to the tire by bonding for example.

Another object of the invention is to provide a wheel characterized in that it comprises a support according to the invention defined hereinabove.

The support is secured to the wheel for example by bonding, screwing, snap-fastening or using a clamping collar.

These and other objects and advantages of the invention will be apparent from the following description, the accompanying drawings and the appended claims.

BRIEF DESCRIPTION OF THE ACCOMPANYING DRAWINGS

The invention will be better understood from reading the description which will follow, given solely by way of example and made with reference to the attached drawings in which.

DETAILED DESCRIPTION OF THE PREFERRED EMBODIMENTS

Figure 1:
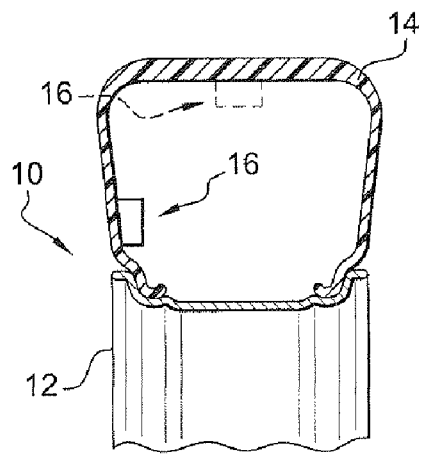
FIG. 1 is a half view in axial section of a wheel and tire system comprising a support according to a first embodiment of the invention.

FIG. 1 depicts a wheel and tire system denoted by the general reference 10.

This system 10 is connected to a vehicle body (not depicted) using conventional means.

In the conventional way, the system 10 comprises a metal wheel 12 on which a tire 14 intended to run along the ground is fitted.

A support 18 and tyre 14 monitoring component 20 system 16 is secured to the internal surface of the tire 14. The support 18 is secured to the lower region of the tire sidewall by bonding.

According to a variant depicted in dotted line in FIG. 1, the support 18 is positioned under the cap of the tire. This position has the advantage that centrifugal force has less of an effect on the securing of the support 18 to the tire 14. That makes this securing more durable.

In the example depicted, the tire 14 monitoring component 20 is a pressure sensor.

Figure 2:
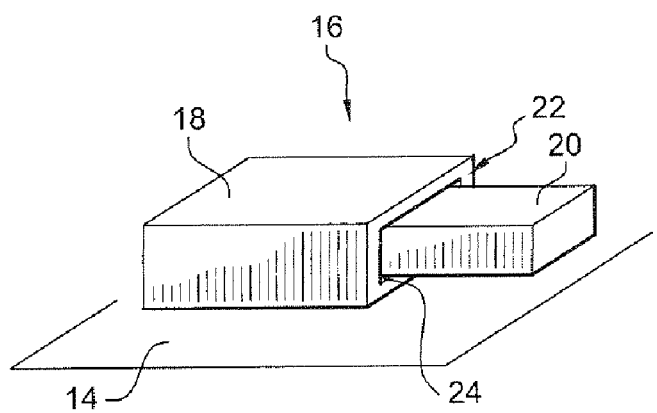
FIG. 2 is a perspective diagram of the support of FIG. 1, to which a tire monitoring component is secured.

The system 16 comprising the support 18 according to a first embodiment and the tire 14 monitoring component 20 is depicted in greater detail in FIG. 2.

The support 18 comprises a housing 22 for the component 20, forming means of securing the component 20 to the support 18.

The housing 22 consists of an orifice 24 formed in the mass of the support 18 and opening onto one of its faces.

In FIG. 2, the component 20 is partially inserted into the housing 22 of the support 18.

Figure 3:
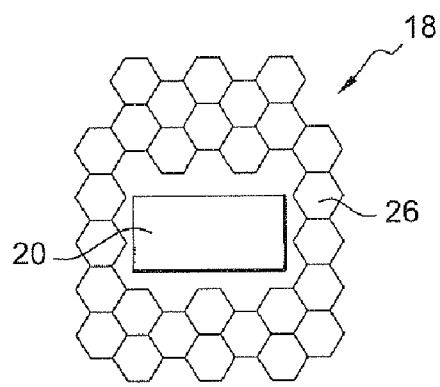
FIG. 3 is a sectioned diagram of the support and component system of FIG. 2, when the system is at atmospheric pressure.
Figure 4:
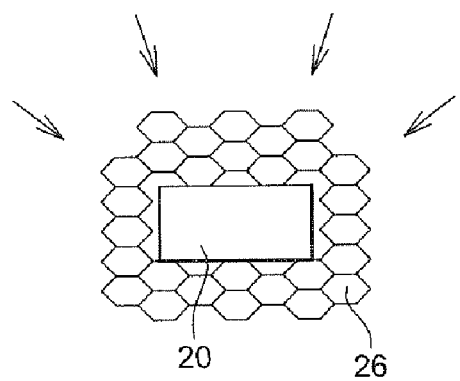
FIG. 4 is a sectioned diagram of the support and component system of FIG. 2 when the system is at a nominal tire inflation pressure.

The support 18 is made of a cellular foam comprising closed cells 26 as depicted schematically in FIGS. 3 and 4.

The cellular foam used to design the support 18 is preferably butyl rubber, which is a material compatible with the rubber used for the tire 14.

The cellular foam of the support 18 is such that the pressure obtaining inside each cell 26 exceeds atmospheric pressure and is below a nominal tire 14 inflation pressure, for example below 2.2 bar.

Thus, at atmospheric pressure, the cells are at rest and the volume of the support 18 is at a maximum. A state such as this is depicted in FIG. 3.

When the support 18 is subjected to a pressure higher than the pressure obtaining inside each cell 26, for example to a nominal tire inflation pressure, the cells 26 are in a compressed state and the support 18 occupies a reduced volume as can be seen in FIG. 4.

The support 18 and its housing 22 are dimensioned in such a way that, at rest, that is to say at atmospheric pressure, the dimensions of the housing 22 exceed the dimensions of the component 20.

Thus, at atmospheric pressure, it is possible to insert the component 20 into the housing 22 of the support 18. The housing 22 therefore constitutes means of securing the component 20 the retaining force of which is low at atmospheric pressure.

The method of securing the monitoring component 20 to the tire 14 by way of the support 18 which is secured to the tire will be described hereinafter.

When the tire 14 is off the wheel 12, the support 18 secured inside the tire 14 is at atmospheric pressure.

By virtue of the cellular foam, the cells 26 are expanded at atmospheric pressure and the volume of the housing 22 is large enough to allow the monitoring component 20 to be inserted.

It is therefore very easy to insert the component 20 into the housing 22 of the support 18 when the tire 14 is off.

Next, the tire 14 is fitted onto the wheel 12 and inflated.

Inflating the tire 14 increases the pressure obtaining inside the tire 14 until this pressure exceeds the pressure obtaining inside the cells 26.

As the tire pressure increases, the cells 26 are compressed and the volume of the housing 22 decreases.

Thus, and as depicted in FIG. 4, the material of the support 18 gradually comes into contact with the component 20 and grips it. The retaining force with which the component is held therefore increases as the pressure of the air surrounding the support increases.

Furthermore, the material of the support 18 tends to mold itself to the overall shape of the monitoring component 20, thus allowing good distribution of the forces generated by the support 18 on the component 20 and affording the component good protection.

Once the pressure in the tire 14 is substantially equal to the nominal inflation pressure, for example 2.2 bar, the component 20 is firmly secured to the support 18.

When the cellular foam of the support 18 is compressed to its maximum extent, the thickness of the foam is substantially equal to the thickness of the walls of the cells 26.

This securing method has the further advantage of absorbing vibrations created by the turning of the tire 14, since the cellular foam of which the support 18 is made is a soft material which deadens vibrations.

Figure 5A:
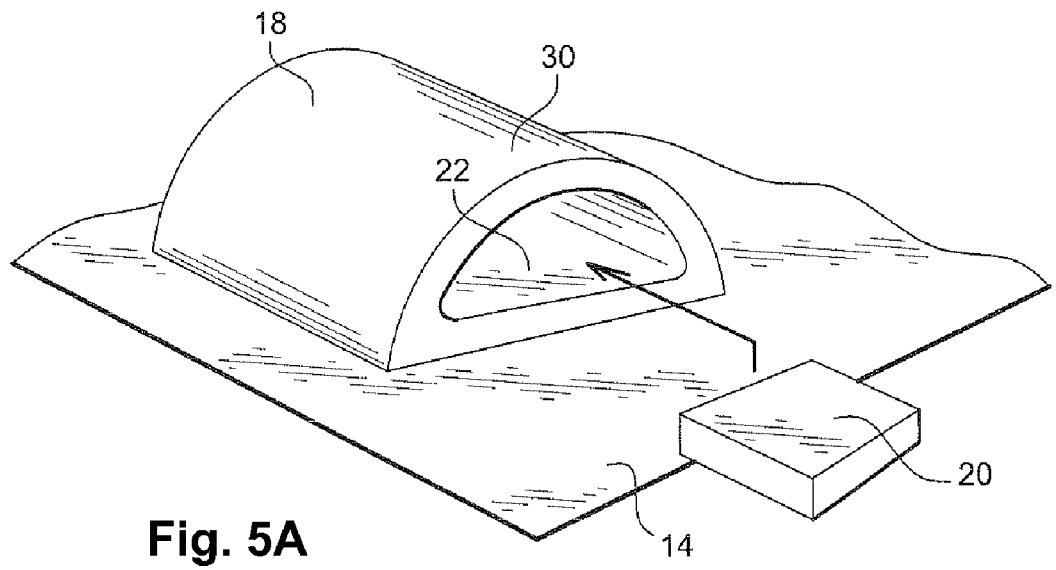
FIGS. 5A and 5B are perspective diagrams of a support according to a variant of the first embodiment of the invention.
Figure 5B:
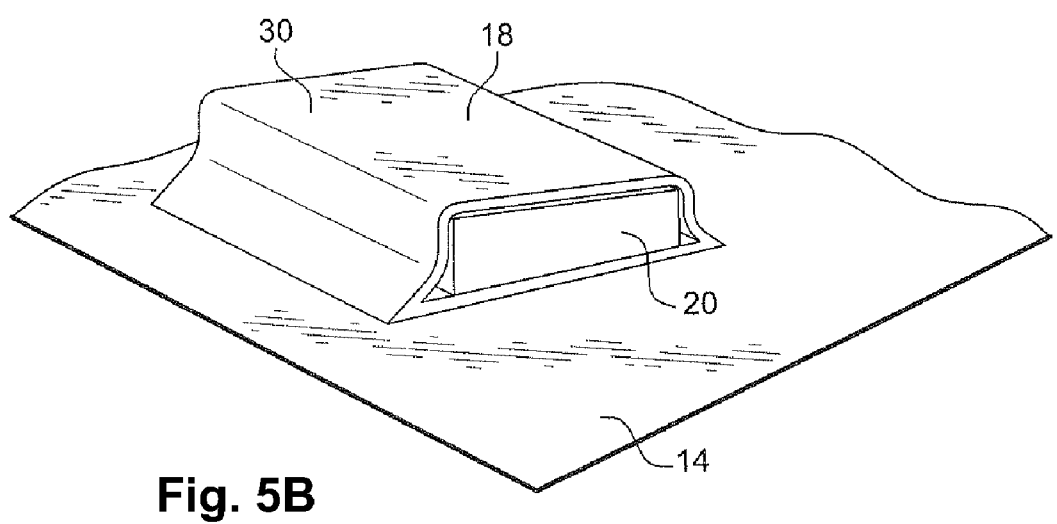

FIGS. 5A and 5B depict a support 18 according to a variant of the first embodiment of the invention.

The support 18 comprises a flexible envelope 30 enclosing a gas. The flexible envelope 30 is shaped in such a way that its exterior surface defines the housing 22 for the monitoring component 20.

The pressure of the gas enclosed in the envelope 30 exceeds atmospheric pressure and is below a nominal tyre inflation pressure.

Thus, at atmospheric pressure, the flexible envelope is inflated under the effect of the gas and the housing 22 is accessible, as depicted in FIG. 5A. It is therefore possible to insert the component 20 into the housing 22.

When the support 18 is under pressure, the flexible envelope is compressed and substantially molds itself to the shape of the component 20, as depicted in FIG. 5B.

According to a second embodiment of the support, the means for securing the component 20 to the support 18 comprise:

component 20 retaining means 32 able to adopt a first position in which they release the component and a second position in which they retain the component 20, and means 34 for actuating the retaining means 32, which are able to cause the retaining means 32 to switch from one position to the other, the actuating means 34 being operated by the pressure of the medium surrounding the support 18.

Figure 6:
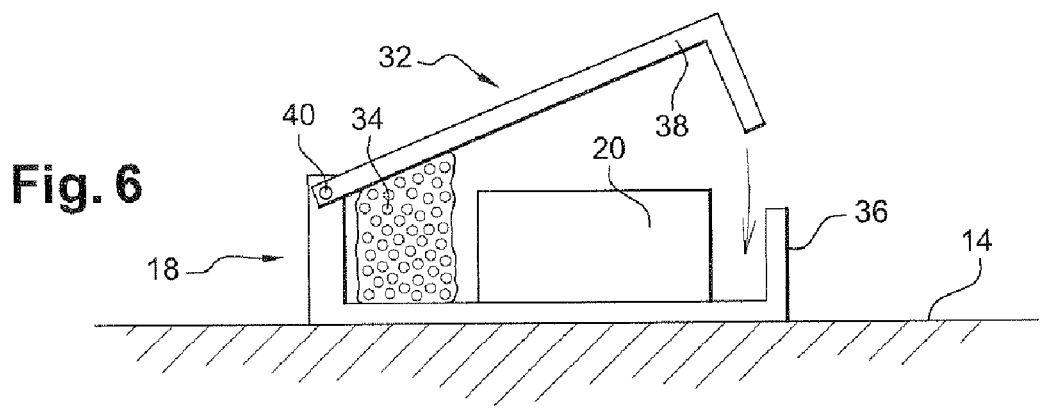
FIGS. 6, 7, 8A and 8B are sectioned diagrams of a support according to several variants of a second embodiment of the invention.

According to a first variant of this second embodiment, which is depicted in FIG. 6, the support 18 comprises a rigid casing 36 for accommodating the component and a lid 38 forming retaining means 32 and connected to the casing 36 by a hinge 40.

The lid 38 is able to adopt an open first position in which the component is released and a closed second position in which the component 20 is retained.

The means 34 for actuating the lid 38 comprise a mass of cellular foam comprising closed cells, the mass being connected both to the bottom of the casing 36 and to the underside of the lid 38.

Thus, when the mass of cellular foam is pressurized, it contracts and acts as a return force returning the lid 38 from its open position to its closed position, as symbolized by an arrow in FIG. 6.

Figure 7:
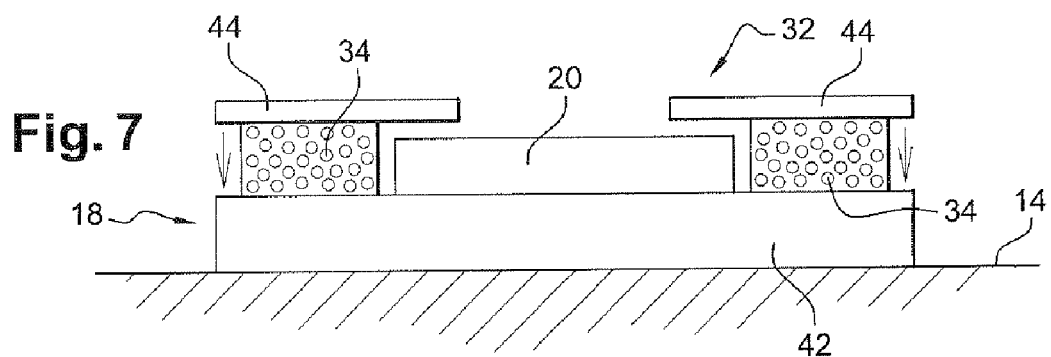

According to a second variant of the second embodiment, which is depicted in FIG. 7, the support 18 comprises a baseplate 42 on which the component 20 is placed and two lugs 44 forming retaining means 32 and intended to clamp the component 20 against the baseplate 42.

Each lug 44 is connected to the baseplate 42 by a mass of cellular foam comprising closed cells forming actuating means 34 for actuating the retaining means 32.

Thus, when the mass of cellular foam is pressurized, it contracts and acts as a return force returning the lug 44 towards the baseplate 42, as symbolized by arrows in FIG. 7.

Figure 8A:
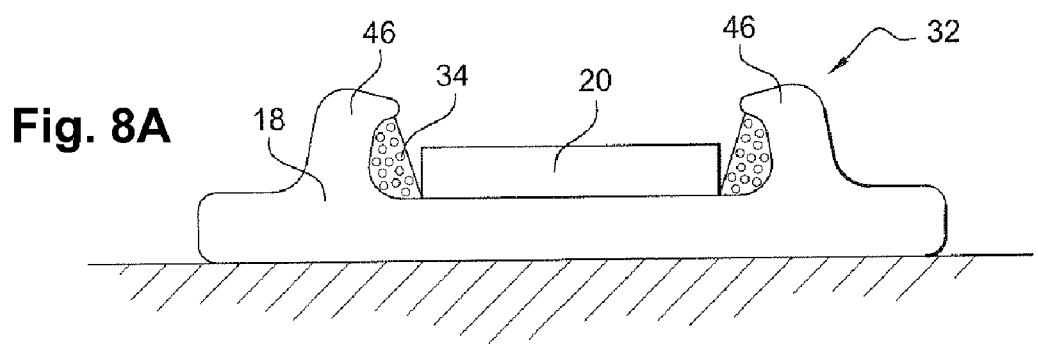
Figure 8B:
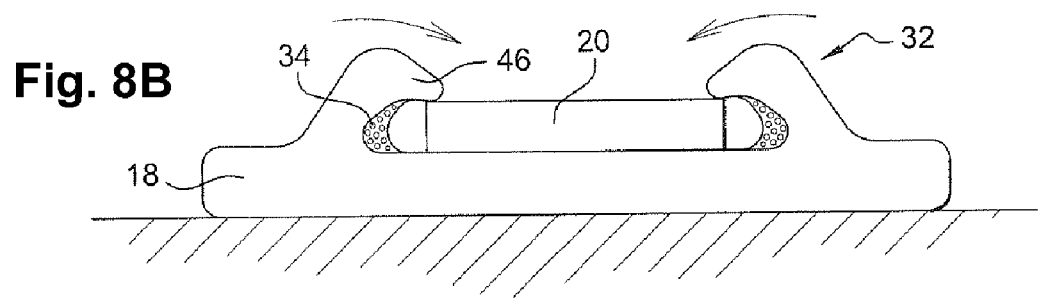

According to a third variant of the second embodiment, depicted in FIGS. 8A and 8B, the support 18 is made of a flexible but incompressible material.

The support 18 comprises projections 46 forming retaining means 32 for retaining the component 20. The projections 46 are in the form of claws intended to grip the component 20.

Given that the claws 46 are flexible, the distance separating them can vary which means that they are able to adopt a parted first position (depicted in FIG. 8A) in which the component 20 is released, and a clamped second position (depicted in FIG. 8B) in which the component 20 is retained.

A mass of cellular foam forming means 34 of actuating the claws 46 is borne by that surface of each claw that faces towards the component 20.

Thus, when the masses of cellular foam are pressurized, they contract and tend to bend the claws in the directions symbolized by arrows in FIG. 8B.

As the material of which the projections 46 are made is incompressible, they do not contract and retain an overall claw shape.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A support for a component for monitoring a tire, of the type intended to be secured to a wheel and tire system and comprising means of securing the component, wherein:

said securing means comprises a component retaining force which is an increasing function of the pressure of the air of the medium surrounding the support, and said securing means are arranged in such a way that, when the support is secured to the wheel and tire system, and when the pressure of the medium surrounding the support is the atmospheric pressure, the component can be introduced or extracted from the support.

2. The support according to claim 1, in which the securing means comprise a housing for the monitoring component, formed in the support, the support being designed so that the higher the pressure of the medium surrounding the support, the smaller the volume of the housing.

3. The support according to claim 2, in which, at atmospheric pressure, the dimensions of the housing exceed the dimensions of the component.

4. The support according to claim 2, made of a material the volume of which is a decreasing function of pressure, the housing being formed in the mass of the material.

5. The support according to claim 4, made of cellular foam comprising closed cells.

6. The support according to claim 5, in which the pressure obtaining inside each closed cell exceeds atmospheric pressure.

7. The support according to claim 6, in which the pressure obtaining inside each closed cell is below a nominal tire inflation pressure, for example, equal to 2.2 bar.

8. The support according to claim 7, in which the cellular foam is made of any one of the materials from the set consisting of polyethylene, polyurethane, 1,2-polybutadiene, polyisobutylene, polyisoprene, butyl rubber, thermoplastic elastomer and a blend of nitrile rubber and polyvinyl chloride.

9. The support according to claim 2, comprising a flexible envelope enclosing a gas, the flexible envelope being shaped such that its exterior surface defines the housing for the monitoring component, the gas pressure preferably exceeding atmospheric pressure and being below a nominal tire inflation pressure, for example equal to 2.2 bar.

10. The support according to claim 1, in which the securing means comprise:

component retaining means able to adopt a first position in which they release the component and a second position in which they retain the component, and means for actuating the retaining means, which are able to cause the retaining means to switch from one position to the other, the actuating means being operated by the pressure of the medium surrounding the support.

11. The support according to claim 10, in which the actuating means comprise a mass of a material the volume of which is a decreasing function of pressure, the material for example being cellular foam comprising closed cells.

12. The support and tire monitoring component system, wherein the support is according to claim 1.

13. The system according to claim 12, in which the component is chosen from any one of the elements of the set consisting of a temperature sensor, a pressure sensor, a strain gauge, an accelerometer, a relative humidity sensor, an emitter, a receiver, an electronic circuit, an identification device.

14. A tire characterized in that it comprises a support according to claim 1.

15. A wheel characterized in that it comprises a support according to claim 1.

16. A support for supporting a component for monitoring a tire, of the type intended to be mounted inside a wheel and tire system, said support comprising a support body for receiving and supporting the component, said support body comprising a retaining force which is an increasing function of a pressure of the air surrounding said support body, said support being arranged in such a way that, when said support body is secured to the wheel and tire system, and when the pressure of the medium surrounding the support is at atmospheric pressure, a component can be introduced into or extracted from the support body.

17. The support according to claim 16, wherein when the pressure surrounding the support body increases, a volume of at least a portion of the support body decreases.

18. The support according to claim 16, in which, at atmospheric pressure, the dimensions of the support body exceed the dimensions of the component.

19. The support according to claim 16, wherein said support body is made of cellular foam comprising closed cells.

20. The support according to claim 19, in which a cell pressure inside each of said closed cells exceeds atmospheric pressure.

21. The support according to claim 19, in which the cellular foam is made from at least one of polyethylene, polyurethane, 1,2-polybutadiene, polyisobutylene, polyisoprene, butyl rubber, thermoplastic elastomer and a blend of nitrile rubber and polyvinyl chloride.

* * * * *